A. SHILALA.
ARMORED GUN CARRIAGE.
APPLICATION FILED MAY 13, 1918.

1,283,334.

Patented Oct. 29, 1918.
2 SHEETS—SHEET 1.

Inventor:
Anthony Shilala,
by Hazard & Miller
Attys.

A. SHILALA.
ARMORED GUN CARRIAGE.
APPLICATION FILED MAY 13, 1918.
1,283,334.
Patented Oct. 29, 1918.
2 SHEETS—SHEET 2.
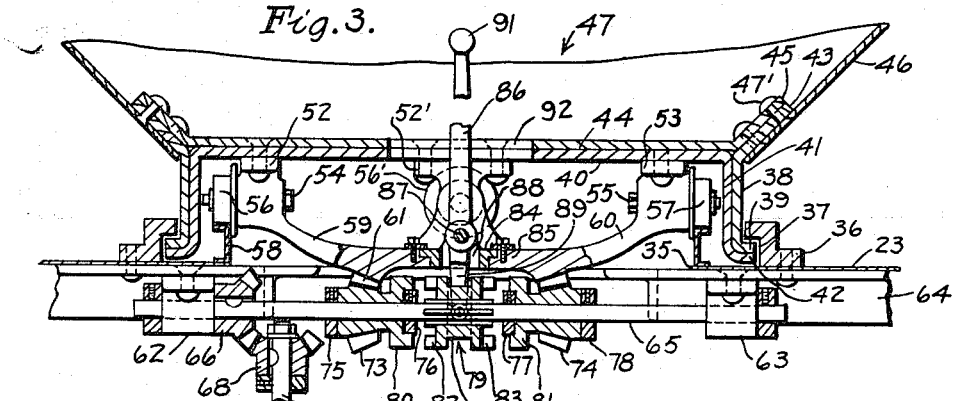
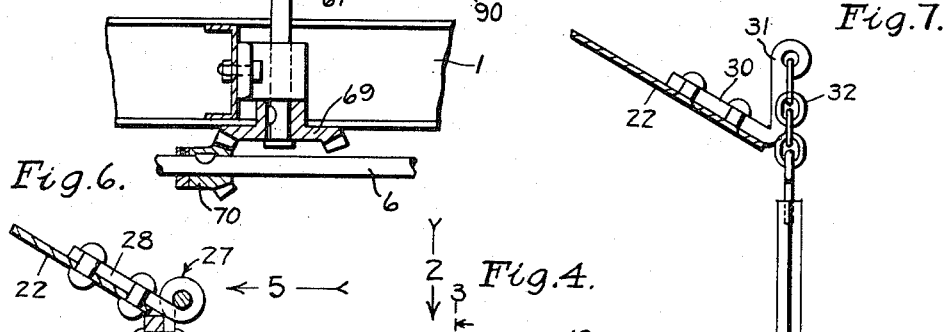
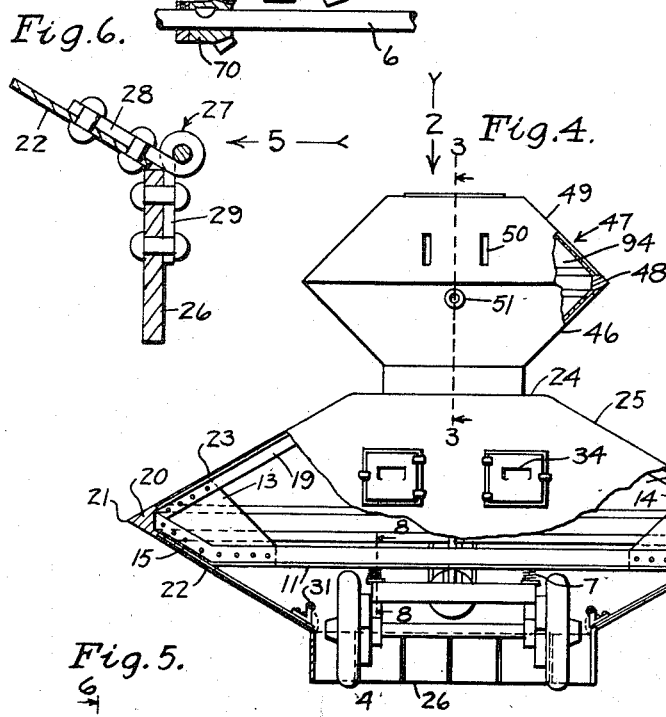
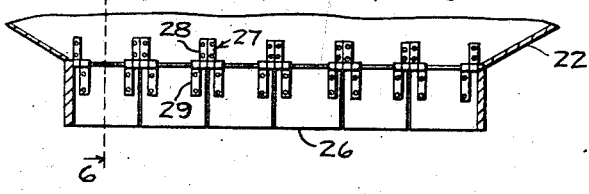
Inventor:
Anthony Shilala,
by Hazard & Miller
Attys.

UNITED STATES PATENT OFFICE.

ANTHONY SHILALA, OF LOS ANGELES, CALIFORNIA.

ARMORED GUN-CARRIAGE.

1,283,334.

Specification of Letters Patent.

Patented Oct. 29, 1918.

Application filed May 13, 1918. Serial No. 234,266.

*To all whom it may concern:*

Be it known that I, ANTHONY SHILALA, a citizen of Russia, residing at Los Angeles, in the county of Los Angeles and State of California, have invented new and useful Improvements in Armored Gun-Carriages, of which the following is a specification.

My object is to make an armored gun carriage and my invention consists in the novel features herein shown, described and claimed.

Fig. 3 is an enlarged vertical longitudinal sectional detail showing the mounting and operation of the turret, and taken on a plane parallel with Fig. 1 and on the line 3—3 of Fig. 4.

Fig. 4 is a rear elevation looking in the direction indicated by the arrows 4 in Figs. 1 and 2, parts being broken away to show the interior construction.

Fig. 5 is a fragmentary vertical cross-section on the line 5—5 of Fig. 1, and looking forwardly, as indicated by the arrow.

Fig. 6 is an enlarged sectional detail on the line 6—6 of Fig. 5.

Fig. 7 is a vertical sectional detail on the line 7—7 of Fig. 1.

Fig. 8 is an enlarged fragmentary sectional detail on the line 8—8 of Fig. 4.

Figure 1:
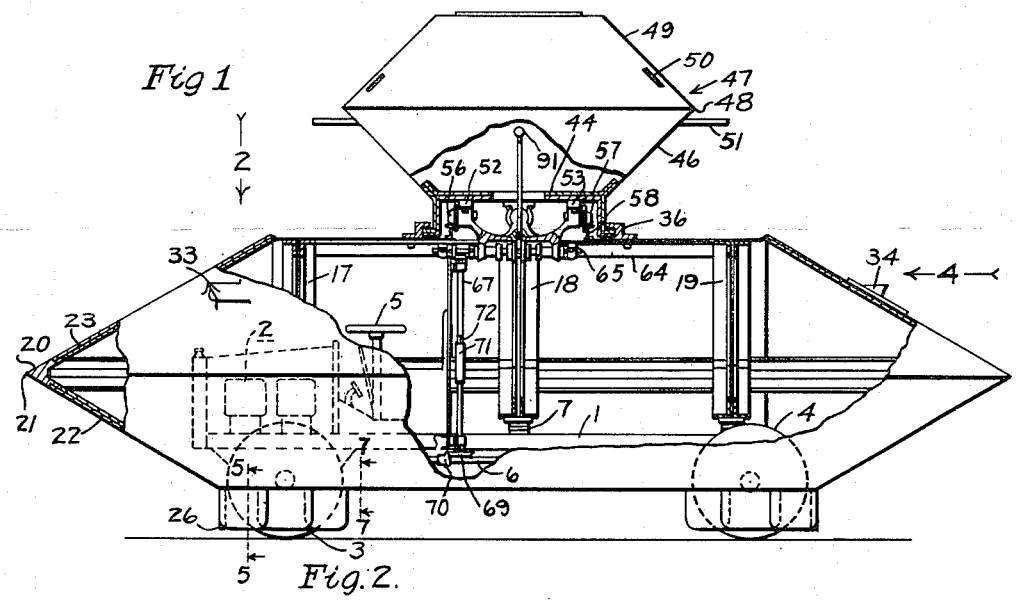
Figure 1 is a side elevation of an armored gun carriage embodying the principles of my invention, as seen looking in the direction indicated by the arrow 1 in Fig. 2, parts being broken away to show the interior.

1 represents the frame of an automobile truck chassis, 2 the engine, 3 the front wheels, 4 the rear wheels, 5 the steering wheel, and 6 the drive shaft.

Springs 7 are mounted upon the side bars of the frame 1; there being preferably three springs on each side. Spring seats 8 are mounted under the springs 7 and spring seats 9 are mounted on top of the springs 7 and studs 10 are rigidly fixed to the spring seats 9 and extend downwardly through the springs 7, through the spring seats 8, and through the side bars of the frame 1.

Angle irons 11 and 12 are placed side by side, spaced a short distance apart, and securely riveted to the spring seats 9, said angle irons 11 and 12 extending transversely of the main frame and each pair of irons resting upon a transverse pair of springs 7. Braces 13 and 14 are fixed between the outer ends of each pair of angle irons 11 and 12 and the extreme outer ends of the angle irons 11 and 12 are turned upwardly and outwardly to form the inclined attaching flanges 15 and 16.

As before suggested, there are three sets of the angle irons 11 and 12, braces 13 and 14, and attaching flanges 15 and 16.

The pairs of roof supporting angle irons 17, 18 and 19 are connected at their ends to the braces 13 and 14.

The buffer 20 is A-shaped in cross-section and elliptic in plan and extends all the way around and is connected to the outer ends of the roof supporting angle irons 17, 18 and 19 and to the meeting outer ends of the angle irons 11 and 12 so as to form a sharp edge 21 all the way around the armored gun carriage.

Armor plates 22 are secured to the flanges 15 and 16 and to the buffer 20 all the way around, said plates 22 extending downwardly and inwardly from the buffer, and roof plates 23 are secured to the supporting irons 17, 18 and 19 and to the buffer 20, the roof plates 23 and the supporting irons 17, 18 and 19 being formed to produce a small flat top 24 surrounded by a sloping top 25.

Figure 2:
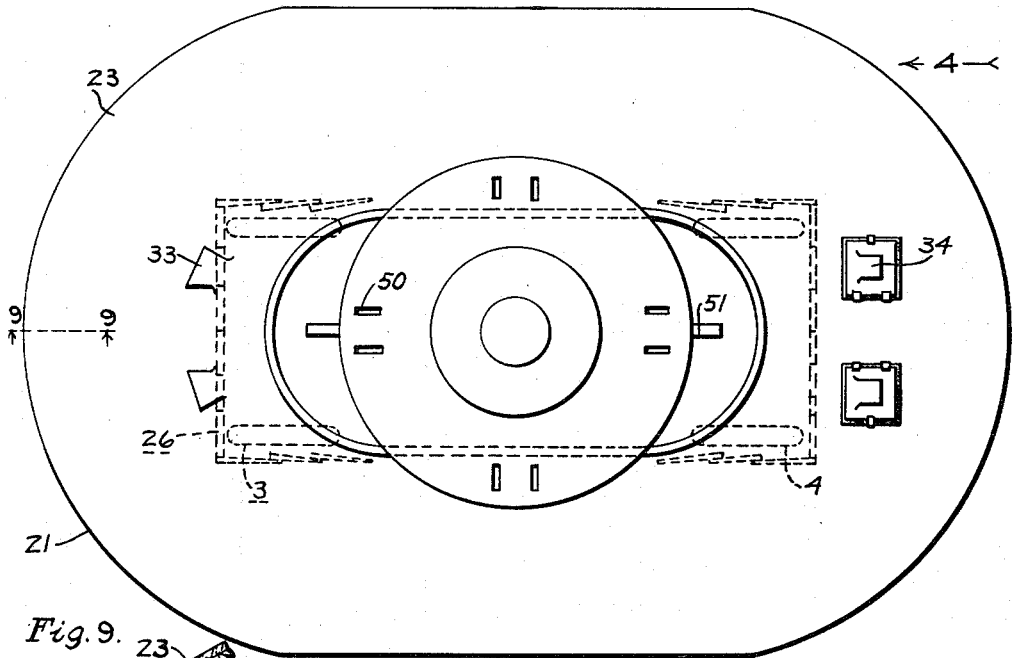
Fig. 2 is a top plan view, as indicated by the arrow 2 in Fig. 1.
Figure 9:
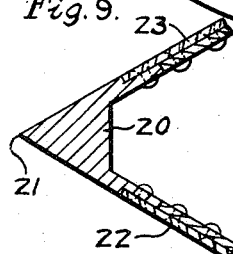
Fig. 9 is an enlarged fragmentary vertical section on the line 9—9 of Fig. 2.

Sections of armor plate 26 are hinged to the lower edges of the plates 22 by strap hinges 27, said sections 26 hanging downwardly and swinging freely and said sections being in position to protect the wheels 3 and 4 from the front or behind. The swinging sections 26 which extend across the front and back are connected as shown in Fig. 6, the straps 28 of the hinges being riveted to the plates 22 and the straps 29 being riveted to the sections 26. The swinging sections which extend along the sides of the wheels overlap each other, the rear edges of two front sections overlapping the front edges of the next two sections and the rear edges of these two sections overlapping the front edges of the last two sections, as shown in dotted lines in Fig. 2, and the hinges supporting these overlapping sections comprise attaching plates 30 riveted to the plates 22, and arms 31 extending upwardly from the lower inner ends of the plates 30, and chain links 32 connecting the upper ends of the arms 31 to the sections.

Windows 33 are formed through the plates 23 at the forward end for the convenience of the operator in guiding the carriage, and similar windows 34 are formed at the rear end.

A circular opening 35 is formed at the center of the top 24. An annular Z-bar 36 is secured to the top concentric around the opening 35, the channel 37 formed by the Z-bar and the top being inwardly. A flat annular band 38 has a flange 39 extending into the channel 37. The secondary circular floor 40 has a second flat annular band 41 fitting in the band 38 and a flange 42 fitting against the flange 39 in the channel 37. An attaching flange 43 extends upwardly and outwardly from the band 38 and the primary floor 44 fits upon the floor 40 and has a flange 45 fitting the flange 43.

The armor plates 46 fit against the outer face of the flange 43 and rivets 47' are inserted through the flanges 45, 43 and the plates 46. The plates 46 are annular and inclined at an angle of about forty-five degrees relative to a vertical line and form the lower half of the turret 47.

A buffer 48 is fixed to the upper edges of the plates 46 and extends all the way around with its sharp edge outwardly. Plates 49 are secured to the buffer 48 to form the upper half of the turret 47.

Windows 50 are formed through the plates 49, and the gun barrels 51 extend through the plates 46.

Hangers 52 and 53 are secured to the bottom of the secondary floor 40 and extend downwardly. Stub shafts 54 and 55 are inserted horizontally through the lower ends of the hangers 52 and 53. Small car wheels 56 and 57 are mounted upon the outer ends of the stub shafts 54 and 55. A circular track 58 is mounted upon the plates 23 around the opening 35 and the car wheels 56 and 57 run upon this track so as to support the weight of the turret and so that the turret may rotate. Arms 59 and 60 extend downwardly and inwardly from the hangers 52 and 53 and a bevel gear 61 connects the inner ends of the arms 59 and 60, said gear 61 facing downwardly. Shaft hangers 62 and 63 are secured to the lower face of the plates 23 and the ribs 64 supporting the plates, said hangers being located just outside of the opening 35. A shaft 65 is mounted in the hangers 62 and 63. A bevel gear 66 is fixed upon one end of the shaft. A shaft 67 is vertically mounted. A bevel gear 68 upon the upper end of the shaft 67 meshes with a bevel gear 66 and a bevel gear 69 upon the lower end of the shaft 67 meshes with a bevel gear 70 upon the drive shaft 6, so that as the drive shaft 6 is operated the shaft 65 is continuously operated. In order that the armor may vibrate up and down on the springs 7 the shaft 67 is made in two pieces. A socket 71 is fixed upon one piece and the squared end 72 of the other piece slides in the socket. Bevel pinions 73 and 74 are loosely mounted upon the shaft 65 and held from endwise motion by collars 75, 76, 77 and 78, said pinions 73 and 74 being continually in mesh with the bevel gear 61.

A double clutch 79 is slidingly splined upon the shaft 65 between the pinions 73 and 74. A clutch member 80 is fixed to the pinion 73 and a clutch member 81 is fixed to the pinion 74, and a clutch member 82 upon the double clutch 79 is adapted to engage the clutch member 80, and a clutch member 83 is adapted to engage the clutch member 81. A bearing base 84 is rotatably mounted vertically through an arm 85 extending diametrically across the bevel gear 61. A lever 86 is mounted upon a pivot 87 carried by the base 84 and said lever extends through a slot 88 in the base and has a fork 89 engaging in a groove 90 in the double clutch 79, so that by manipulating the handle 91 upon the upper end of the lever 86 the double clutch 79 is moved longitudinally on the shaft 65 one way to bring the clutch members 82 and 80 into engagement to rotate the turret in one direction, and the other way to bring the clutch members 81 and 83 into engagement to rotate the turret in the other direction. The hand lever 86 extends through a slot 92 in the floors 40 and 44.

A pair of hangers 52' is mounted at right angles to the hangers 52 and 53 and support wheels 56' running on the track 58.

The guns and gunners and their equipment may be carried within the armored chambers 93 and 94 and an operator manipulates the steering wheel 5 and another operator the handle 91 and other operators manipulate the guns and equipment. If desired, the turret may be connected to rotate continuously in one direction or the other or it may be operated step by step as desired.

Various changes may be made in the details of construction without departing from the spirit of my invention as claimed.

I claim:

1. In an armored gun carriage, the combination with an automobile truck comprising a chassis, an engine, front traction wheels, rear traction wheels, a steering wheel and a drive shaft, of spring seats mounted upon the side bars of the chassis, springs upon the spring seats, second spring seats on top of the springs, studs fixed to the second spring seats and extending downwardly through the first spring seats and through the side bars, angle irons secured to the second spring seats and extending transversely, roof supporting irons connected to the outer ends of the angle irons, a buffer connected to the outer ends of the angle irons and extending all the way around, armor plates secured to the roof supporting irons, and armor plates extending downwardly and inwardly from the buffer.

2. In an armored gun carriage, the combination with an automobile truck of an armored compartment mounted upon the truck, there being a central opening through the top of the armored compartment, an annular Z-bar secured in place around the central opening, a circular track secured in place around the central opening inside of the Z-bar, a turret mounted above the central opening and having an annular band fitting inside of the Z-bar, a flange extending outwardly from the lower edge of the band to engage the Z-bar, wheels for supporting the turret and running upon the annular track, and means for rotating the turret.

3. In an armored gun carriage the combination with an automobile truck of an armored compartment mounted upon the truck and extending downwardly outside of the truck to a level with the axles all the way around, and sections of armor plate hinged to the lower edges of the armor plates of the armored compartment and hanging downwardly and swinging freely in position to protect the wheels of the automobile, said armor plates overlapping as required to deflect bullets coming from the front or the rear, the hinges supporting the side overlapping armor plates comprising, attaching plates riveted to the rigid plates, arms extending upwardly from the lower ends of the attaching plates, and chain links connecting the upper ends of the arms to the overlapping sections.

In testimony whereof I have signed my name to this specification.

ANTHONY SHILALA.